US012612007B2

(12) United States Patent
Shimazu et al.

(10) Patent No.: US 12,612,007 B2
(45) Date of Patent: Apr. 28, 2026

(54) GAS GENERATOR

(71) Applicant: NIPPON KAYAKU KABUSHIKI KAISHA, Tokyo (JP)

(72) Inventors: Sho Shimazu, Himeji (JP); Masaki Hiraoka, Himeji (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/835,107

(22) PCT Filed: Jan. 13, 2023

(86) PCT No.: PCT/JP2023/000773
§ 371 (c)(1),
(2) Date: Aug. 1, 2024

(87) PCT Pub. No.: WO2023/149167
PCT Pub. Date: Aug. 10, 2023

(65) Prior Publication Data
US 2025/0153676 A1 May 15, 2025

(30) Foreign Application Priority Data

Feb. 2, 2022 (JP) ................................. 2022-014997

(51) Int. Cl.
*B60R 21/264* (2006.01)
*B60R 21/26* (2011.01)

(52) U.S. Cl.
CPC . *B60R 21/2644* (2013.01); *B60R 2021/26011* (2013.01); *B60R 2021/26041* (2013.01); *B60R 21/2646* (2013.01); *B60R 2021/2648* (2013.01)

(58) Field of Classification Search
CPC ............ B60R 21/2644; B60R 21/2646; B60R 2021/26011; B60R 2021/26041; B60R 2021/2648
See application file for complete search history.

(56) References Cited

U.S. PATENT DOCUMENTS 7,320,479 B2 * 1/2008 Trevillyan ............ B60R 21/272
280/736
7,325,829 B2 * 2/2008 Kelley .................. B60R 21/272
280/736
(Continued)

FOREIGN PATENT DOCUMENTS

CN 108290543 A 7/2018
DE 102014111040 A1 2/2016
(Continued)

OTHER PUBLICATIONS

JP-2007314102-A (machine translation) (Year: 2007).*
(Continued)

*Primary Examiner* — Jason D Shanske
*Assistant Examiner* — Joselynn Y Sliteris
(74) *Attorney, Agent, or Firm* — Oblon, McClelland, Maier & Neustadt, L.L.P.

(57) ABSTRACT

A gas generator includes an igniter, a partition member that axially partitions a space in the inside of a housing into a gas generating agent accommodation chamber and a filter chamber, and a gas generating agent and a coil spring accommodated in the gas generating agent accommodation chamber. The coil spring is interposed between the partition member and the gas generating agent and fixes the gas generating agent while it keeps the gas generating agent away from the partition member. V1 represents a volume of the gas generating agent accommodation chamber and V2 represents a volume of a non-filled space which is a space where the gas generating agent is not arranged in the inside of the gas generating agent accommodation chamber as a result of arrangement of the coil spring, where V1 and V2 satisfy a condition of $0.05 \leq V2/V1 \leq 0.32$.

4 Claims, 5 Drawing Sheets

(56) References Cited

U.S. PATENT DOCUMENTS

| | | | | |
|---|---|---|---|---|
| 7,341,276 | B2 * | 3/2008 | Kelley | .................. B60R 21/272 |
| | | | | 280/736 |
| 10,953,842 | B2 * | 3/2021 | Imai | .................... B60R 21/2646 |
| 11,052,865 | B2 * | 7/2021 | Hiraoka | ................ B60R 21/264 |
| 12,060,031 | B2 * | 8/2024 | Inoue | ......................... B01J 7/00 |
| 12,134,365 | B2 * | 11/2024 | Yabuuchi | ........... B60R 22/4628 |
| 2007/0075535 | A1 | 4/2007 | Trevillyan et al. | |
| 2019/0337481 | A1 | 11/2019 | Lin | |
| 2022/0126784 | A1 | 4/2022 | Yabuuchi et al. | |

FOREIGN PATENT DOCUMENTS

| | | | | | |
|---|---|---|---|---|---|
| EP | | 1769980 | A2 * | 4/2007 | ........... B60R 21/272 |
| JP | | 2007-99266 | A | 4/2007 | |
| JP | | 2007314102 | A * | 12/2007 | |
| JP | | 2011-31763 | A | 2/2011 | |
| JP | | 2017193192 | A * | 10/2017 | |
| JP | | 2020-504002 | A | 2/2020 | |
| WO | WO 2020/149399 | | A1 | 7/2020 | |
| WO | WO 2022/138134 | | A1 | 6/2022 | |

OTHER PUBLICATIONS

JP-2017193192-A (machine translation) (Year: 2017).*
International Search Report issued Apr. 4, 2023 in PCT/JP2023/000773 filed Jan. 13, 2023, 3 pages.
Extended European Search Report issued in European Patent Application No. 23749484.4 on Dec. 4, 2025, citing documents 1 and 2 therein.

* cited by examiner

FIG.4

| | | INNER DIAMETER OF GAS GENERATING AGENT ACCOMMODATION CHAMBER R [mm] | AXIAL LENGTH OF GAS GENERATING AGENT ACCOMMODATION CHAMBER L1 [mm] | AXIAL LENGTH OF COIL SPRING L2 [mm] | VOLUME OF GAS GENERATING AGENT ACCOMMODATION CHAMBER V1 [mm³] | VOLUME OF NON-FILLED SPACE V2 [mm³] | VOLUME RATIO V2/V1 [-] | MAXIMUM INTERNAL PRESSURE IN COMBUSTION CHAMBER [MPa] | AVERAGE VALUE OF MAXIMUM INTERNAL PRESSURES IN COMBUSTION CHAMBER [MPa] | EVALUATION |
|---|---|---|---|---|---|---|---|---|---|---|
| VERIFICATION EXAMPLE 1 | 1-1 | 17.4 | 59.0 | 0.8 | 14029.4 | 190.2 | 0.014 | 116.9 | 115.6 | NOT GOOD |
| | 1-2 | | | | | | | 114.2 | | |
| VERIFICATION EXAMPLE 2 | 2-1 | 17.4 | 64.2 | 6.0 | 15265.9 | 1426.7 | 0.093 | 68.4 | 68.4 | GOOD |
| VERIFICATION EXAMPLE 3 | 3-1 | 17.4 | 71.5 | 11.7 | 17011.3 | 2782.1 | 0.164 | 76.1 | 62.6 | GOOD |
| | 3-2 | | | | | | | 49.1 | | |
| VERIFICATION EXAMPLE 4 | 4-1 | 17.4 | 77.8 | 18.0 | 18509.3 | 4280.2 | 0.231 | 50.5 | 50.2 | GOOD |
| | 4-2 | | | | | | | 50.0 | | |
| VERIFICATION EXAMPLE 5 | 5-1 | 17.4 | 84.4 | 24.6 | 20078.7 | 5849.6 | 0.291 | 42.1 | 42.1 | GOOD |
| VERIFICATION EXAMPLE 6 | 6-1 | 17.4 | 89.1 | 29.3 | 21196.3 | 6967.2 | 0.329 | 111.4 | 111.4 | NOT GOOD |

GAS GENERATOR

TECHNICAL FIELD

The present invention relates to a gas generator incorporated in an air bag apparatus as a passenger protection apparatus equipped in a car and the like, and particularly to what is called a cylinder type gas generator having an elongated columnar outer geometry that is suitably incorporated into a side air bag apparatus and the like.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with the air bag serving as a cushion by instantaneously expanding and developing the air bag at the time of collision of a vehicle.

A gas generator is equipment which is incorporated in this air bag apparatus, an igniter therein being ignited in response to power feed caused by a control unit at the time of collision of a vehicle to thereby burn a gas generating agent with flame caused by the igniter and instantaneously generate a large amount of gas, and thus expands and develops an air bag.

Depending on a position of installation in a vehicle and the like or on specifications such as output, gas generators of various constructions are available. A gas generator called a cylinder type gas generator represents one example. The cylinder type gas generator has an outer geometry in an elongated columnar shape and it is suitably incorporated in a side air bag apparatus, a curtain air bag apparatus, a knee air bag apparatus, or a seat cushion air bag apparatus.

Normally, in a cylinder type gas generator, an igniter is assembled at one end in an axial direction of a housing, a gas generating agent accommodation chamber where a gas generating agent is accommodated is provided on a side of the one end, a filter chamber where a filter is arranged is provided on a side of the other end in the axial direction of the housing, and a gas discharge opening is provided in a circumferential wall portion of the housing in a portion defining the filter chamber.

In the cylinder type gas generator thus constructed, the gas generating agent burns with activation of the igniter so that gas is generated in the inside of the housing, generated gas passes through the filter, and thereafter gas is discharged to the outside through the gas discharge opening.

For example, Japanese Patent Laying-Open No. 2007-314102 (PTL 1) discloses a cylinder type gas generator of this type.

CITATION LIST

Patent Literature

PTL 1: Japanese Patent Laying-Open No. 2007-314102

SUMMARY OF INVENTION

Technical Problem

In general, it is important in a gas generator to burn a gas generating agent persistently in a stable manner while it is active. For stable and persistent combustion of the gas generating agent, the gas generating agent should be in a prescribed high-pressure environment. Therefore, the gas generator is designed such that a pressure in a space in the inside of a housing which is a pressure resistant container increases to an adequate level at the time of activation by reduction in size of a gas discharge opening provided in the housing to a desired size.

Reduction in weight of the gas generator, on the other hand, has recently strongly be demanded. For reduction in weight of the gas generator, decrease in thickness of the housing is effective. A construction of the gas generator as such can lead also to reduction in material cost and consequently to reduction in manufacturing cost. When the thickness of the housing is simply decreased, however, pressure resistance performance of the housing may not sufficiently be secured.

Therefore, in order to achieve reduction in weight of the gas generator while achieving stable operations of the gas generator, it is essential to lower the pressure in the space in the inside of the housing at the time of activation to an adequate level within a range where the gas generating agent can persistently burn in a stable manner. It is not easy, however, to realize this by devisal of a structure of the gas generator.

Therefore, the present invention was made in view of such problems, and an object thereof is to provide a gas generator that can achieve not only stable operations but also reduction in weight and manufacturing cost by devisal of a structure thereof.

Solution to Problem

A gas generator based on the present invention includes a housing, a partition member, an igniter, and a coil spring. The housing is formed from an elongated cylindrical member having one end and the other end in an axial direction closed and contains a gas generating agent accommodation chamber where a gas generating agent is accommodated and a filter chamber where a filter is arranged. The partition member axially partitions a space in the inside of the housing such that the gas generating agent accommodation chamber is provided at a position on a side of the one end of the housing and the filter chamber is provided at a position on a side of the other end of the housing. The igniter is assembled to the one end of the housing for burning the gas generating agent. The coil spring is accommodated in the gas generating agent accommodation chamber by being interposed between the partition member and the gas generating agent, and fixes the gas generating agent in the inside of the gas generating agent accommodation chamber by biasing the gas generating agent toward the one end of the housing while the coil spring keeps the gas generating agent away from the partition member. The gas generator based on the present invention satisfies a condition of $0.05 \leq V2/V1 \leq 0.32$, where $V1$ represents a volume of the gas generating agent accommodation chamber and $V2$ represents a volume of a non-filled space, the non-filled space being a space where the gas generating agent is not arranged in the inside of the gas generating agent accommodation chamber as a result of arrangement of the coil spring.

In the gas generator based on the present invention, the igniter may include an ignition portion where an ignition agent is accommodated, and in that case, the ignition portion preferably faces the gas generating agent without another member being interposed.

In the gas generator based on the present invention, the coil spring may include a cylindrical portion located on a side of the partition member and a pressing portion that presses the gas generating agent toward the one end of the housing by being located at an end of the cylindrical portion on a side of the gas generating agent.

In the gas generator based on the present invention, the partition member may be formed from a cylindrical member with bottom, the cylindrical member including a separation wall portion arranged to be orthogonal to the axial direction of the housing and an annular wall portion erected from a circumferential edge of the separation wall portion toward the one end of the housing, and in that case, an axial end of the coil spring located on the side of the other end of the housing is preferably inserted at least in the inside of the partition member.

Advantageous Effects of Invention

According to the present invention, a gas generator that can achieve not only stable operations but also reduction in weight and manufacturing cost by devisal of a structure thereof can be provided.

BRIEF DESCRIPTION OF DRAWINGS

FIG. 4 shows a table of a summary of test conditions and test results in a verification test.

DESCRIPTION OF EMBODIMENTS

Figure 1:
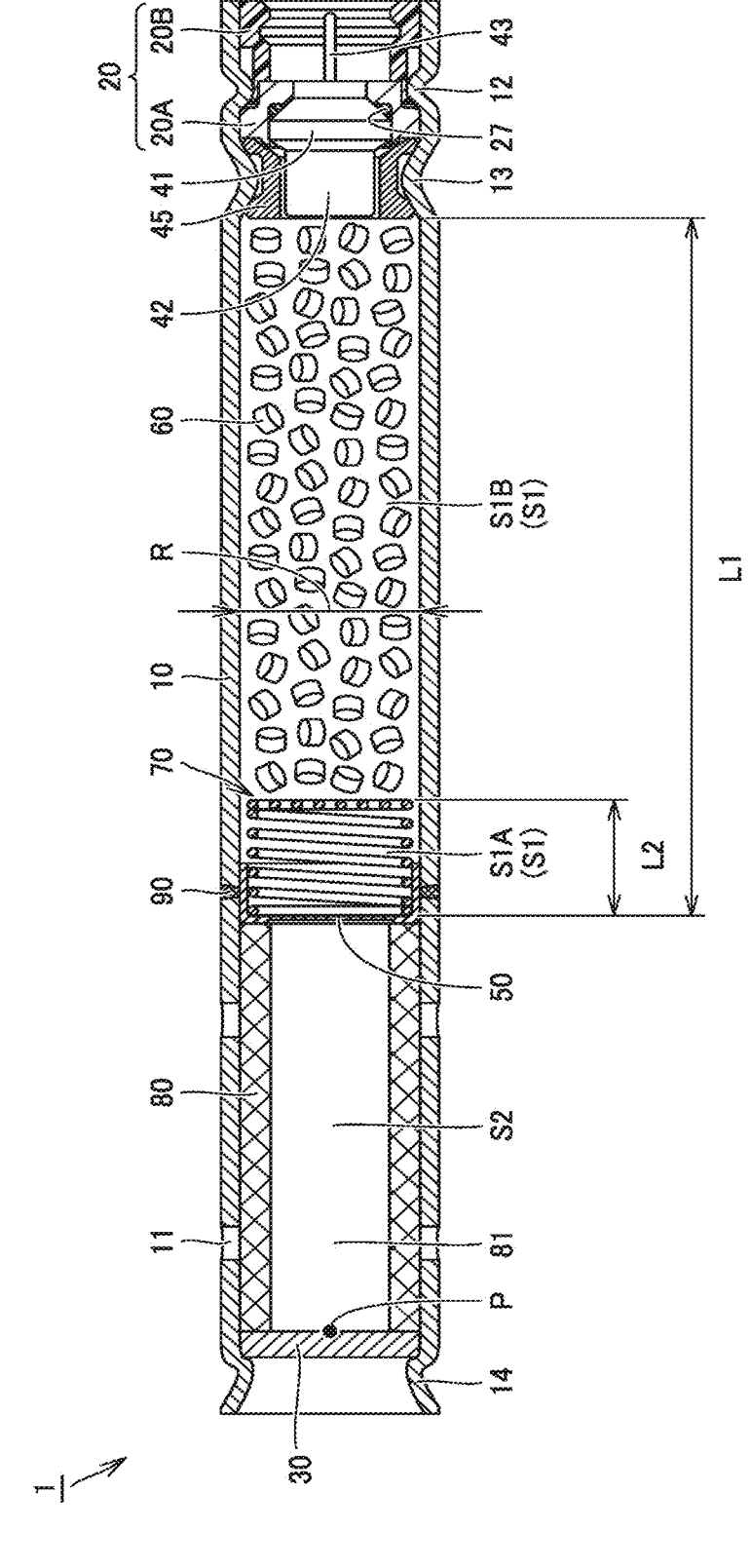
FIG. 1 is a schematic diagram of a cylinder type gas generator according to an embodiment.

An embodiment of the present invention will be described hereinafter in detail with reference to the drawings. An embodiment shown below represents application of the present invention to a cylinder type gas generator incorporated in a side air bag apparatus. The same or common elements in an embodiment shown below have the same reference characters allotted in the drawings and description thereof will not be repeated.

EMBODIMENT

Figure 2:
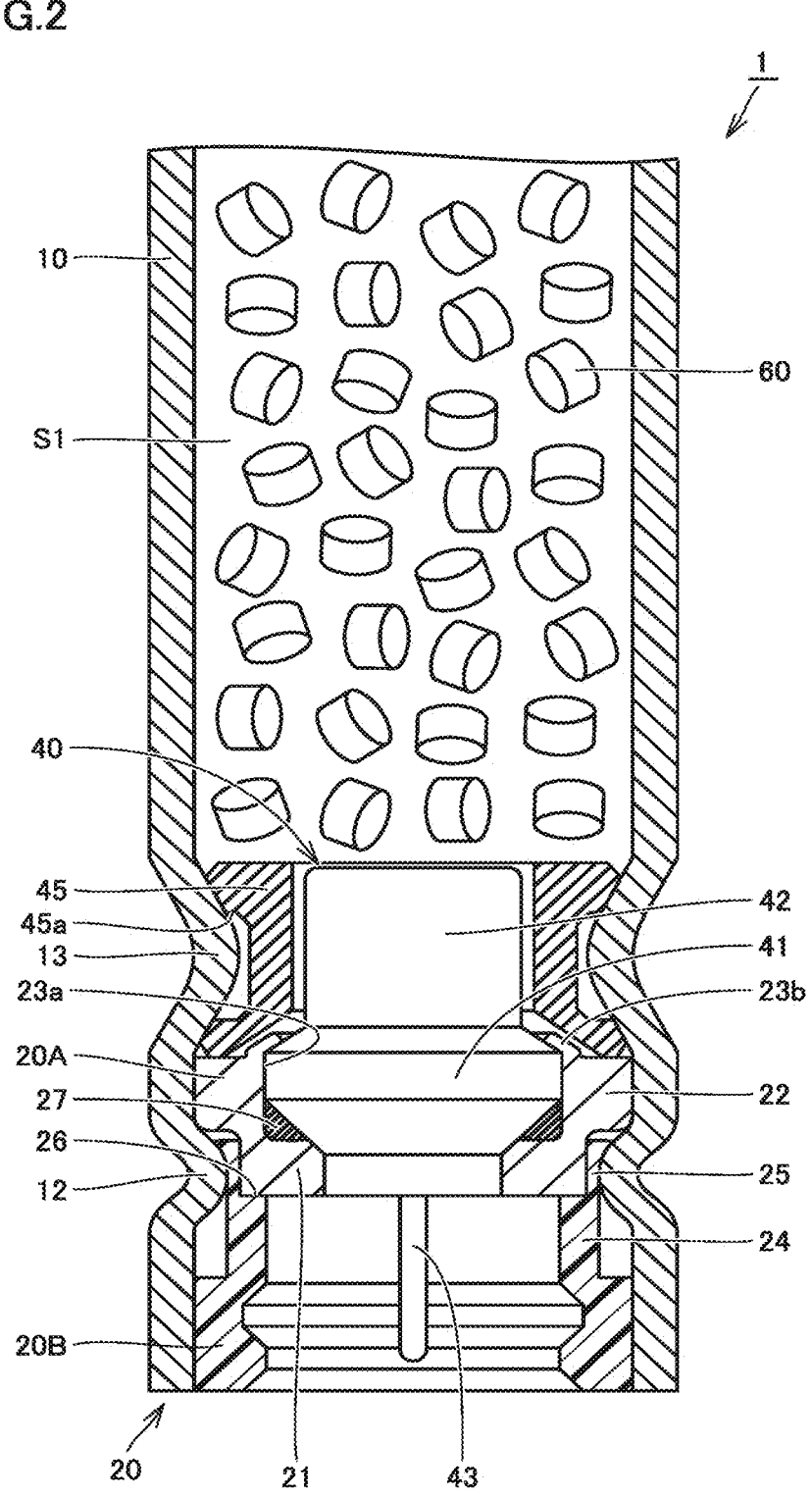
FIG. 2 is an enlarged cross-sectional view of a vicinity of an igniter of the cylinder type gas generator shown in FIG. 1.
Figure 3:
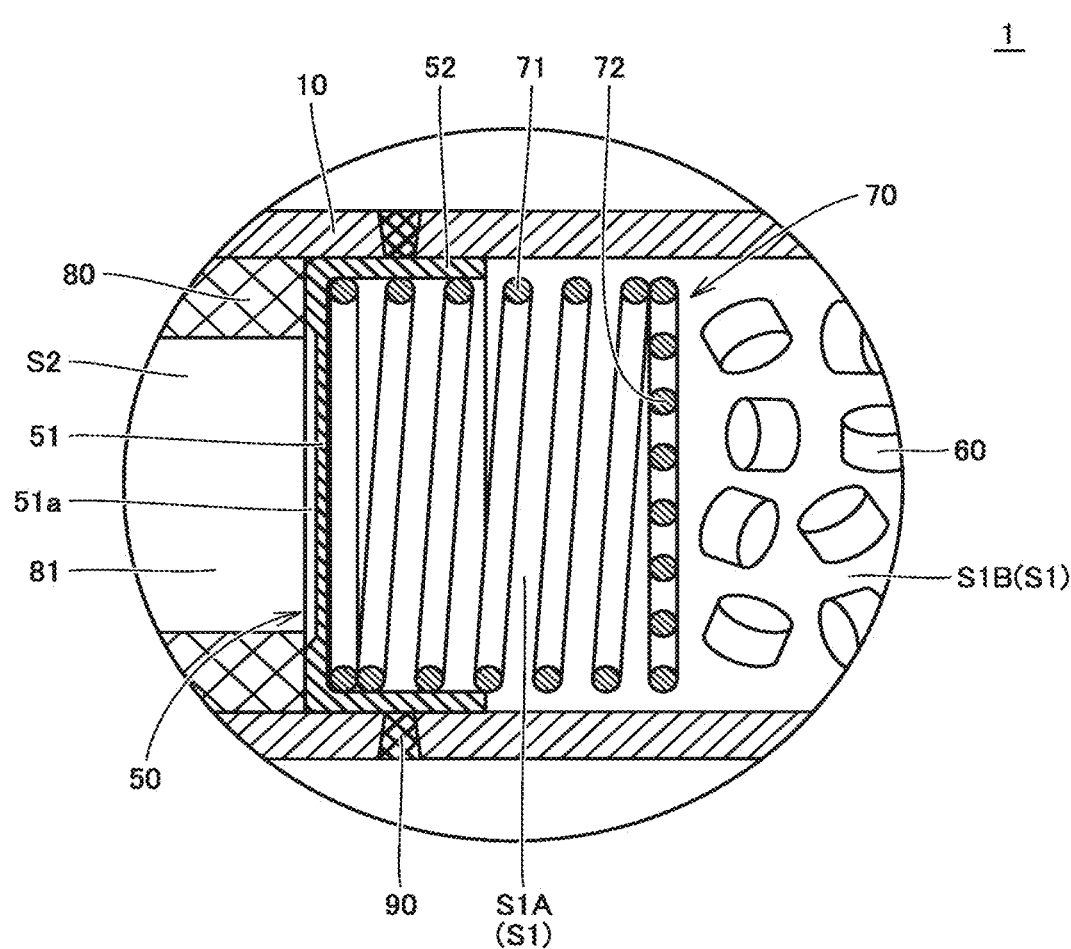
FIG. 3 is an enlarged cross-sectional view of the vicinity of a partition member of the cylinder type gas generator shown in FIG. 1.

FIG. 1 is a schematic diagram of a cylinder type gas generator according to an embodiment. FIGS. 2 and 3 are an enlarged cross-sectional view of the vicinity of an igniter and an enlarged cross-sectional view of the vicinity of a partition member, of the cylinder type gas generator shown in FIG. 1, respectively. A construction of a cylinder type gas generator 1 according to the present embodiment will initially be described with reference to FIGS. 1 to 3.

As shown in FIG. 1, cylinder type gas generator 1 has an elongated columnar outer geometry and has an elongated circular cylindrical housing having closed one and the other ends located in an axial direction. The housing includes a housing main body 10, a holder assembly 20, and a closing member 30.

An igniter 40, a partition member 50, a gas generating agent 60, a coil spring 70, and a filter 80 as internal components are accommodated in the housing constituted of housing main body 10, holder assembly 20, and closing member 30. In the housing, a gas generating agent accommodation chamber S1 where gas generating agent 60 and coil spring 70 among the internal components described above are accommodated and a filter chamber S2 where filter 80 is arranged are located.

In the description below, a space corresponding to above-described gas generating agent accommodation chamber S1 in the space in the inside of cylinder type gas generator 1 and a space corresponding to a hollow portion 81 of later-described filter 80 in filter chamber S2 described above are collectively referred to as a combustion chamber.

Housing main body 10 is made of an elongated circular cylindrical member which implements a circumferential wall portion of the housing and has an opening provided at each of opposing ends in the axial direction. Holder assembly 20 is formed from a cylindrical member including a hollow opening like a through hole which extends in a direction in parallel to the axial direction of housing main body 10, and includes a holder portion 20A and a connector portion 20B which will be described later. Closing member 30 is formed from a member substantially in a disc shape.

Housing main body 10 may be formed from a member made of metal such as stainless steel, iron steel, an aluminum alloy, or a stainless alloy or from a circularly cylindrically formed press-formed product by press-working of a rolled steel plate represented by SPCE. Alternatively, housing main body 10 may be formed from an electric resistance welded tube represented by STKM.

In particular, when housing main body 10 is formed from a press-formed product of a rolled steel plate or an electric resistance welded tube, housing main body 10 can be formed more inexpensively and readily and with much lighter weight than when the housing main body is formed from a member made of metal such as stainless steel or iron steel.

Holder portion 20A of holder assembly 20 and closing member 30 are formed from a member made of metal such as stainless steel, iron steel, an aluminum alloy, or a stainless alloy.

Holder assembly 20 is fixed to housing main body 10 so as to close one axial opening end of housing main body 10. Specifically, while holder assembly 20 is inserted in one opening end of housing main body 10, a prescribed position of housing main body 10 is decreased in diameter radially inward toward holder assembly 20 and another prescribed position of housing main body 10 is decreased in diameter radially inward toward the vicinity of holder assembly 20, so that holder assembly 20 is fixed by swaging to housing main body 10. Thus, one axial end of the housing is implemented by holder assembly 20. Details of fixing by swaging will be described later.

Closing member 30 is fixed to housing main body 10 so as to close the other axial opening end of housing main body 10. Specifically, while closing member 30 is inserted in the other opening end of housing main body 10, a prescribed position of housing main body 10 is decreased in diameter radially inward toward the vicinity of closing member 30, so that closing member 30 is fixed by swaging to housing main body 10. The other axial end of the housing is thus implemented by closing member 30. Details of this fixing by swaging will also be described later.

Such fixing by swaging is called omnidirectional swaging in which housing main body 10 is substantially uniformly decreased in diameter radially inward. With such omnidirectional swaging, swaging portions 12 to 14 are provided in housing main body 10. Housing main body 10 is thus in direct contact with holder assembly 20 and closing member 30, so that a gap is prevented from being provided therebetween.

A structure for assembly of holder assembly 20 and closing member 30 to housing main body 10 is not limited to the assembly structure described above (details of which will be described later), and another assembly structure may be adopted. Alternatively, housing main body 10 and closing member 30 do not have to be separate members, and they may be implemented as one member in a shape of a cylinder with bottom.

As shown in FIGS. 1 and 2, igniter 40 is assembled to the above-described one axial end of the housing by being supported by holder assembly 20. Igniter 40 serves to burn gas generating agent 60 and is set to face a space in the housing.

Igniter 40 serves to initiate flame and it is also referred to as a squib. Igniter 40 includes a base 41, an ignition portion 42, and a pair of terminal pins 43. Base 41 is a part that holds ignition portion 42 and the pair of terminal pins 43 and is also fixed to holder assembly 20. Base 41 holds the pair of terminal pins 43 as the pair of terminal pins is inserted therethrough.

Ignition portion 42 contains an ignition agent that initiates flame by being ignited and burnt at the time of activation and a resistor (bridge wire) for ignition of the ignition agent. The pair of terminal pins 43 is connected to ignition portion 42 for ignition of the ignition agent.

More specifically, ignition portion 42 includes a squib cup formed like a cup. The resistor described above is attached to couple to each other, tip ends of the pair of terminal pins 43 inserted in the squib cup, and the ignition agent is loaded in the squib cup so as to surround the resistor or to be in proximity to the resistor. An enhancer agent may be loaded in ignition portion 42 as necessary.

Here, a Nichrome wire or a resistance wire made of an alloy containing platinum and tungsten is generally used as a resistor, and ZPP (zirconium potassium perchlorate), ZWPP (zirconium tungsten potassium perchlorate), lead tricinate, or the like is generally made use of as the ignition agent. A composition composed of metal powders/oxidizing agent represented by $B/KNO_3$, $B/NaNO_3$, or $Sr(NO_3)_2$, a composition composed of titanium hydride/potassium perchlorate, or a composition composed of B/5-aminotetrazole/potassium nitrate/molybdenum trioxide is employed as the enhancer agent.

Upon sensing collision, a prescribed amount of current flows in a resistor through terminal pin 43. As the prescribed amount of current flows in the resistor, Joule heat is generated in the resistor and the ignition agent starts burning. Thermal particles at a high temperature caused by burning cleave the squib cup where the ignition agent is accommodated. A time period from flow of a current in the resistor until activation of igniter 40 is generally not longer than 2 milliseconds in a case that the Nichrome wire is employed as the resistor.

Igniter 40 is fixed to holder assembly 20 while ignition portion 42 thereof projects toward the inside of the housing and a part thereof is arranged in the inside of the above-described hollow opening of holder assembly 20. Igniter 40 thus has ignition portion 42 located on a side of gas generating agent accommodation chamber S1 and has terminal pins 43 located opposite to the side of gas generating agent accommodation chamber S1.

As shown in FIG. 2, holder assembly 20 includes holder portion 20A made of metal, holder portion 20A being located on the side of gas generating agent accommodation chamber S1, and connector portion 20B made of resin, connector portion 20B being located opposite to gas generating agent accommodation chamber S1. Holder assembly 20 is implemented as an integrated component by assembly of holder portion 20A and connector portion 20B to each other in advance, and it is attached to above-described one opening end of housing main body 10.

Holder portion 20A is formed from a flat member substantially in a disc shape including in a central portion thereof, a through portion that extends along the axial direction, and includes a cylindrical first barrel portion 21 and an annular projection 22 that projects outward from an outer circumferential surface of first barrel portion 21.

Holder portion 20A is inserted in housing main body 10 such that the axial direction thereof is in parallel to the axial direction of housing main body 10. The through portion provided in holder portion 20A thus defines a part of the above-described hollow opening of holder assembly 20 and annular projection 22 projects from first barrel portion 21 along a radial direction of housing main body 10. Annular projection 22 described above is provided at an end of first barrel portion 21 on the side of gas generating agent accommodation chamber S1.

Holder portion 20A is a member that receives and holds igniter 40, and in order to receive igniter 40, it includes an accommodation portion 23a in a recessed shape at an axial end on the side of gas generating agent accommodation chamber S1. Accommodation portion 23a communicates with the through portion provided in holder portion 20A. A swaging portion 23b is provided at an end of holder portion 20A on the side of gas generating agent accommodation chamber S1 to surround accommodation portion 23a. Swaging portion 23b is a part for fixing by swaging igniter 40 to holder portion 20A.

Igniter 40 is fixed to holder portion 20A with base 41 thereof being accommodated in accommodation portion 23a of holder portion 20A. Specifically, igniter 40 is fixed to holder portion 20A in such a manner that base 41 is inserted in accommodation portion 23a of holder portion 20A, base 41 abuts on a bottom surface of accommodation portion 23a, and swaging portion 23b provided in holder portion 20A is bent in this state. Igniter 40 is thus held by holder portion 20A.

A sealing member 27 formed from an O ring or the like is interposed between holder portion 20A and igniter 40 so as to bury and seal a gap between holder portion 20A and igniter 40. According to such a construction, airtightness in that portion can therefore be ensured. The method of fixing igniter 40 is not limited to the fixing method with the use of swaging portion 23b described above and another fixing method may be used.

Connector portion 20B is formed from a member substantially in a shape of a circular cylinder, the member including in a central portion thereof, a through portion that extends along the axial direction, and includes a second barrel portion 24 in a cylindrical shape and a cylindrical portion 25 that extends along the axial direction from one axial end of second barrel portion 24.

Connector portion 20B is inserted in housing main body 10 such that the axial direction thereof is in parallel to the axial direction of housing main body 10. The through portion provided in connector portion 20B thus defines a part of the above-described hollow opening of holder assembly 20 and cylindrical portion 25 extends from second barrel portion 24 toward gas generating agent accommodation chamber S1.

Holder portion 20A described above is fixed by being press-fitted into connector portion 20B. More specifically, first barrel portion 21 of holder portion 20A is press-fitted into cylindrical portion 25 of connector portion 20B so that first barrel portion 21 and cylindrical portion 25 are in pressure contact with each other. Holder portion 20A and connector portion 20B are thus fixed not to readily be detached from each other.

Connector portion 20B serves to receive a connector connected to terminal pin 43 of igniter 40. Terminal pin 43 of igniter 40 is arranged in the inside of connector portion 20B. The through portion provided in connector portion 20B described above defines a part for receiving the connector.

More specifically, in cylinder type gas generator 1, igniter 40 should electrically be connected to a control unit (not shown) of a vehicle or the like provided outside, and a harness is normally used for this electrical connection. A male connector is attached to a tip end of the harness, and connector portion 20B should be provided with a female connector connectable to the male connector. The through portion provided in connector portion 20B implements the female connector.

As the male connector of the harness is inserted in the through portion that functions as the female connector, a core of the harness and terminal pin 43 electrically conduct to each other and thus wired connection between igniter 40 and the control unit of the vehicle or the like is established.

Connector portion 20B also functions as a member that ensures airtightness between housing main body 10 and holder portion 20A. A part for ensuring airtightness between housing main body 10 and holder portion 20A is mainly implemented by cylindrical portion 25 of connector portion 20B.

Specifically, cylindrical portion 25 is inserted in the opening end of housing main body 10 and externally attached to first barrel portion 21 of holder portion 20A. In a portion in the axial direction of housing main body 10 where cylindrical portion 25 is located, first barrel portion 21 of holder portion 20A, cylindrical portion 25 of connector portion 20B, and housing main body 10 are arranged in this order from a radially inner side toward a radially outer side of housing main body 10. In other words, first barrel portion 21 is surrounded by cylindrical portion 25 and cylindrical portion 25 is surrounded by housing main body 10.

A part of housing main body 10 corresponding to cylindrical portion 25 (that is, a portion that covers cylindrical portion 25) is provided with swaging portion 12 decreased in diameter radially inward. As swaging portion 12 is provided, cylindrical portion 25 of connector portion 20B formed from the member made of resin is sandwiched between swaging portion 12 of housing main body 10 formed from the member made of metal and first barrel portion 21 of holder portion 20A formed from the member made of metal, so as to seal the gap between housing main body 10 and first barrel portion 21.

When swaging portion 12 is provided in housing main body 10, cylindrical portion 25 is sandwiched between housing main body 10 and first barrel portion 21, and as a result of application of resulting load, cylindrical portion 25 deforms by being compressed. Cylindrical portion 25 and housing main body 10 thus come in intimate contact with each other, and cylindrical portion 25 and first barrel portion 21 come in intimate contact with each other.

Therefore, since cylindrical portion 25 is interposed between housing main body 10 and first barrel portion 21 as being in intimate contact with housing main body 10 and first barrel portion 21, the gap described above can be sealed. Therefore, according to such a construction, airtightness in that portion can be ensured.

Though a material for connector portion 20B is not particularly restricted, for example, a nylon-based resin as represented by nylon 6, nylon 66, and 6 nylon or 66 nylon filled with a glass filler, a polyacetal (POM) resin, a polycarbonate (PC) resin, a polyphenylene sulfide (PPS) resin, a polybutylene terephthalate (PBT) resin, or the like can suitably be employed.

In holder portion 20A, annular projection 22 is provided at a position closer to gas generating agent accommodation chamber S1 relative to first barrel portion 21. Therefore, annular projection 22 also performs a function as a stopper that prevents holder assembly 20 from coming off from housing main body 10. The function of annular projection 22 as the stopper is performed not only while cylinder type gas generator 1 is being manufactured or not operating but also while a pressure caused by increase in internal pressure in gas generating agent accommodation chamber S1 at the time of operation is applied.

In cylinder type gas generator 1 according to the present embodiment, an inner diameter of cylindrical portion 25 is larger than an inner diameter of second barrel portion 24, and connector portion 20B is provided with an annular stepped surface 26 that connects an inner circumferential surface of second barrel portion 24 and an inner circumferential surface of cylindrical portion 25 to each other. First barrel portion 21 of holder portion 20A is thus inserted in one axial end of connector portion 20B provided with annular stepped surface 26, and accordingly, an axial end surface of first barrel portion 21 located opposite to gas generating agent accommodation chamber S1 abuts on annular stepped surface 26.

According to such a construction, holder portion 20A and connector portion 20B can be fixed to each other by press-fitting of holder portion 20A into connector portion 20B as described above, and furthermore, holder portion 20A and connector portion 20B can accurately be positioned along the axial direction of housing main body 10.

When the construction is adopted, the female connector described above is defined by the axial end surface of first barrel portion 21 located opposite to gas generating agent accommodation chamber S1 and the inner circumferential surface of second barrel portion 24.

As shown in FIGS. 1 and 3, partition member 50 is arranged at a prescribed position in the space in the housing. Partition member 50 is a member for partitioning the space in the housing into gas generating agent accommodation chamber S1 and filter chamber S2 in the axial direction.

Partition member 50 is in a shape of a circular cylinder with bottom, and formed from a member made of metal such as stainless steel, iron steel, an aluminum alloy, or a stainless alloy. Partition member 50 includes a separation wall portion 51 in a form of a flat plate arranged to be orthogonal to the axial direction of housing main body 10 and an annular wall portion 52 in a form of a cylindrical wall erected from a circumferential edge of separation wall portion 51 toward gas generating agent accommodations S1. Partition member 50 is arranged such that a main surface on an outer side of separation wall portion 51 abuts on filter 80 and an outer circumferential surface of annular wall portion 52 abuts on an inner circumferential surface of housing main body 10.

A score 51a is provided in a main surface of separation wall portion 51 which abuts on filter 80. Score 51a serves to provide an opening as a result of rupture of separation wall portion 51 with increase in internal pressure in gas generating agent accommodation chamber S1 as a result of burning of gas generating agent 60, and it is provided, for example, as a plurality of grooves provided to radially intersect with one another. Score 51a is provided in a portion in filter 80 opposed to a hollow portion 81.

Partition member 50 is fixed by being joined to housing main body 10 while it is located in housing main body 10. More specifically, partition member 50 is fixed by being press-fitted into housing main body 10 and being welded at a portion of contact between annular wall portion 52 of partition member 50 and housing main body 10 or in the vicinity thereof.

A welded portion 90 that extends along the circumferential direction of housing main body 10 is thus formed in partition member 50 and the portion of housing main body 10 where partition member 50 is located. Electron beam welding, laser welding, resistance welding, and the like can suitably be used for welding between partition member 50 and housing main body 10.

When partition member 50 is thus fixed to housing main body 10 by welding, a gap between partition member 50 and housing main body 10 is buried and thus sealed by welded portion 90. Therefore, according to such a construction, airtightness in that portion can be ensured.

The method of fixing partition member 50 to housing main body 10 is not limited to the fixing method using press-fitting and welding described above, and another fixing method may be used. Airtightness between partition member 50 and housing main body 10 in that case can be ensured by providing an O ring or a sealing tape at an appropriate position.

As shown in FIGS. 1 to 3, in a space inside the housing, gas generating agent 60, coil spring 70, and a combustion control member 45 are arranged in a space lying between holder assembly 20 and partition member 50 (that is, gas generating agent accommodation chamber S1).

Among these, combustion control member 45 is arranged on a side where holder assembly 20 is located (that is, the side of above-described one end in the axial direction of the housing in gas generating agent accommodation chamber S1) and coil spring 70 is arranged on a side where partition member 50 is located (that is, the side of above-described the other end in the axial direction of the housing in gas generating agent accommodation chamber S1). Gas generating agent 60 is arranged between combustion control member 45 and coil spring 70.

Gas generating agent 60 is an agent which is ignited by thermal particles produced as a result of activation of igniter 40 and produces gas as it burns. A non-azide-based gas generating agent is preferably employed as gas generating agent 60, and gas generating agent 60 is formed as a molding generally containing a fuel, an oxidizing agent, and an additive.

For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-amino-tetrazole, and the like are suitably made use of.

As the oxidizing agent, for example, basic metal salt such as basic copper nitrate and basic copper carbonate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of.

As the additive, a binder, a slag formation agent, a combustion modifier, or the like is exemplified. As the binder, for example, an organic binder such as metal salt of carboxymethyl cellulose and stearate, or an inorganic binder such as synthetic hydrotalcite and Japanese acid clay can suitably be made use of. As the slag formation agent, silicon nitride, silica, Japanese acid clay, or the like can suitably be made use of. As the combustion modifier, a metal oxide, ferrosilicon, activated carbon, graphite, or the like can suitably be made use of.

A shape of a molding of gas generating agent 60 includes various shapes such as a particulate shape including a granule, a pellet, and a column, and a disc shape. Among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which cylinder type gas generator 1 is incorporated, and for example, a shape optimal for the specifications is preferably selected by selecting a shape allowing change over time of a rate of generation of gas during burning of gas generating agent 60. Furthermore, in addition to a shape of gas generating agent 60, a size of a molding or an amount thereof for filling is preferably selected as appropriate, in consideration of a linear burning velocity, a pressure exponent, or the like of gas generating agent 60.

Coil spring 70 is provided for the purpose of prevention of gas generating agent 60 formed from a molding from being crushed by vibration or the like, and includes a cylindrical portion 71 and a pressing portion 72 formed by bending a metal wire rod.

Cylindrical portion 71 is formed from a part like a spring obtained by helical winding of a metal wire rod and arranged such that one end thereof abuts on separation wall portion 51 of partition member 50. Pressing portion 72, on the other hand, is formed at the other end of cylindrical portion 71. Pressing portion 72 is constructed to substantially be in a disc shape as a whole, for example, by arranging a metal wire rod substantially in parallel or spirally at prescribed intervals. Pressing portion 72 is in contact with gas generating agent 60.

Coil spring 70 is compressed by being sandwiched between partition member 50 and gas generating agent 60. Thus, gas generating agent 60 is elastically biased toward holder assembly 20 (that is, toward above-described one end of the housing) by coil spring 70 and thus prevented from moving in the inside of gas generating agent accommodations S1. Therefore, according to such a construction, gas generating agent 60 made of a molding can be prevented from being crushed by vibration or the like.

In assembly of coil spring 70, coil spring 70 is sandwiched between partition member 50 and gas generating agent 60 and compressed, so as to also accommodate variation in dimension among various components accommodated in the housing.

Combustion control member 45 serves to efficiently guide thermal particles generated in igniter 40 to gas generating agent 60 at the time of activation of cylinder type gas generator 1. Combustion control member 45 is substantially in a cylindrical shape, and externally attached to ignition portion 42 to surround the same by covering a circumferential surface of ignition portion 42.

Ignition portion 42 is thus surrounded by combustion control member 45. Therefore, at the time of rupture of the squib cup that defines the outer surface of ignition portion 42, an opening is mainly provided at a tip end of the squib cup located on the side of gas generating agent 60 and accordingly a direction of travel of thermal particles produced in ignition portion 42 concentrates in the axial direction of the housing.

In other words, combustion control member 45 is arranged to bury a gap between housing main body 10 and ignition portion 42. Combustion control member 45 is thus located on a radially outer side of ignition portion 42, radially outward travel of thermal particles produced in ignition portion 42 is blocked by combustion control member 45, and consequently the direction of travel of thermal particles concentrates in the axial direction.

Therefore, according to such a construction, at the time of activation of cylinder type gas generator 1, directivity can be provided to the direction of travel of thermal particles produced in ignition portion 42 of igniter 40 so that thermal particles can efficiently be guided to gas generating agent 60.

As shown in FIG. 2, an annular recess 45a that extends in a circumferential direction is provided in an outer circumferential surface of combustion control member 45. This annular recess 45a is a part for fixing combustion control member 45 to housing main body 10. Specifically, while combustion control member 45 is located in housing main body 10, a portion of housing main body 10 corresponding to annular recess 45a is decreased in diameter radially inward to be engaged with annular recess 45a so that combustion control member 45 is fixed by swaging to housing main body 10. The portion of housing main body 10 corresponding to annular recess 45a is thus provided with swaging portion 13.

Swaging portion 12 and swaging portion 13 described above are provided at prescribed positions in housing main body 10, to thereby realize also fixing of holder assembly 20 to housing main body 10. In other words, as a pair of swaging portions 12 and 13 is provided to sandwich annular projection 22 provided in holder portion 20A in holder assembly 20, movement of holder portion 20A along the axial direction of housing main body 10 is restricted and hence holder assembly 20 is securely fixed to housing main body 10.

As shown in FIG. 1, in the space in the housing, filter 80 is arranged in the space (that is, filter chamber S2) lying between closing member 30 and partition member 50. Filter 80 is formed from a circular cylindrical member having hollow portion 81 extending in a direction in parallel to the axial direction of housing main body 10, and has one axial end surface abutting on closing member 30 and has the other axial end surface abutting on separation wall portion 51 of partition member 50.

Filter 80 functions as cooling means for cooling gas by removing heat from the gas at a high temperature when the gas produced as a result of burning of gas generating agent 60 passes through this filter 80 and also functions as removal means for removing slag (residues) or the like contained in the gas. As described above, by making use of filter 80 formed from a circular cylindrical member, a flow resistance against gas which flows through filter chamber S2 at the time of activation is suppressed and an efficient flow of the gas can be achieved.

A filter formed from an aggregate of metal wire rods or metal mesh materials suitably made of stainless steel or iron steel can be made use of as filter 80. Specifically, a wire gauze of stocking stitch, a plain-woven wire gauze, an aggregate of crimped metal wire rods, or a material obtained by compressing the former with the use of a press can be made use of.

Alternatively, a material obtained by winding a perforated metal plate can also be made use of as filter 80. In this case, as the perforated metal plate, for example, expanded metal obtained by making staggered cuts in a metal plate and providing holes by widening the cuts to thereby work the metal plate in a mesh, hook metal obtained by perforating a metal plate and collapsing burrs caused around a periphery of the hole for flattening, or the like can be made use of.

A plurality of gas discharge openings 11 are provided along the circumferential direction and the axial direction in housing main body 10 in a portion defining filter chamber S2. The plurality of gas discharge openings 11 serve for guiding gas which has passed through filter 80 to the outside of the housing.

Closing member 30 is fixed to housing main body 10 by swaging portion 14 provided at a prescribed position of housing main body 10. Specifically, swaging portion 14 decreased in diameter radially inward is provided in a portion of housing main body 10 that is located opposite to the side where filter chamber S2 is located when viewed from closing member 30 and located adjacently to closing member 30, so that closing member 30 is sandwiched between swaging portion 14 and filter 80. Since movement of closing member 30 in the axial direction of housing main body 10 is thus restricted, closing member 30 is securely fixed to housing main body 10.

An operation of cylinder type gas generator 1 according to the present embodiment when it is activated will now be described with reference to FIG. 1.

With reference to FIG. 1, when a vehicle on which cylinder type gas generator 1 according to the present embodiment is mounted collides, collision is sensed by collision sensing means separately provided in the vehicle and igniter 40 is activated based thereon by current feed caused by a control unit separately provided in the vehicle.

When igniter 40 is activated, the ignition agent or the enhancer agent in addition thereto burns. Then, a pressure in ignition portion 42 increases, which cleaves the squib cup of ignition portion 42, and thermal particles resulting from burning of the ignition agent or the enhancer agent in addition thereto flow to the outside of ignition portion 42. Thermal particles which have reached gas generating agent 60 burn gas generating agent 60 so that a large amount of gas is produced in gas generating agent accommodation chamber S1.

Accordingly, a pressure in gas generating agent accommodation chamber S1 increases and an internal pressure in gas generating agent accommodation chamber S1 reaches a prescribed pressure, which causes a rupture in a portion of partition member 50 where score 51a is provided. An opening is thus provided in a portion of partition member 50 opposed to hollow portion 81 of filter 80, and gas generating agent accommodation chamber S1 and filter chamber S2 communicate with each other through the opening.

Accordingly, gas produced in gas generating agent accommodation chamber S1 flows into filter chamber S2 through the opening provided in partition member 50. The gas which has flowed into filter chamber S2 flows along the axial direction through hollow portion 81 of filter 80, thereafter changes its direction toward a radial direction, and passes through filter 80. At that time, heat is removed through filter 80 and the gas is cooled, and slag contained in gas is removed by filter 80.

Gas which has passed through filter 80 is discharged to the outside of the housing through gas discharge opening 11 provided in housing main body 10. Discharged gas is introduced into an air bag provided adjacently to cylinder type gas generator 1 to thereby expand and develop the air bag.

Cylinder type gas generator 1 according to the present embodiment can achieve not only stable operations but also reduction in weight and manufacturing cost as a result of devisal of the structure thereof, which will be described in detail below.

As shown in FIGS. 1 to 3, in cylinder type gas generator 1 according to the present embodiment, as described above, coil spring 70 is arranged in gas generating agent accommodation chamber S1 as being interposed between partition member 50 and gas generating agent 60. Gas generating agent 60 is thus located at a distance from partition member 50, and gas generating agent accommodation chamber S1 includes a non-filled space S1A which is a space where gas generating agent 60 is not arranged as a result of arrangement of coil spring 70 and a filled space S1B which is a space where gas generating agent 60 is arranged.

In cylinder type gas generator 1 according to the present embodiment, combustion control member 45 in addition to gas generating agent 60 and coil spring 70 is arranged in gas generating agent accommodation chamber S1. Since combustion control member 45 substantially functions as a pressure bulkhead, a space where combustion control member 45 is arranged is not included in gas generating agent accommodation chamber S1.

In cylinder type gas generator 1 according to the present embodiment, a volume ratio V2/V1 which is a ratio between V1 and V2 satisfies a condition of $0.05 \leq V2/V1 \leq 0.32$, where V1 represents a volume of gas generating agent accommodation chamber S1 described above (that is, the sum of a volume of non-filled space S1A and a volume of filled space S1B described above) and V2 represents a volume of non-filled space S1A.

By satisfying this condition, when cylinder type gas generator 1 according to the present embodiment is activated, the pressure in the space in the inside of the housing (that is, an internal pressure in the combustion chamber) can be lowered to an adequate level within the range where gas generating agent 60 can burn persistently in a stable manner. The condition is derived based on results in a verification test which will be described later.

Specifically, as volume ratio V2/V1 described above satisfies the condition of $0.05 \leq V2/V1$, a cavity having a prescribed volume is provided in a portion of gas generating agent accommodation chamber S1 on the side of partition member 50, and hence unburnt gas generating agent 60 densely concentrated in that portion at the time of activation of cylinder type gas generator 1 can be suppressed. Therefore, since the opening provided in partition member 50 as a result of rupture of separation wall portion 51 is prevented from being closed by unburnt gas generating agent 60, a flow resistance of gas in that portion can be lowered. Therefore, gas generated in gas generating agent accommodation chamber S1 can more smoothly flow into filter chamber S2 and increase in internal pressure in the combustion chamber can effectively be suppressed.

It has experimentally been confirmed, however, that when the cavity described above is constructed to excessively be large, not only the size of the housing increases but also the internal pressure in the combustion chamber significantly increases at the time of activation to the contrary. This may be caused by the following. A large amount of unburnt cracked gas is generated with combustion of the gas generating agent in an initial stage of activation of the cylinder type gas generator. When the cavity described above is excessively large, this unburnt cracked gas does not remain in the inside of the gas generating agent accommodation chamber but flows into the filter chamber through the opening provided in the partition member as a result of rupture of the separation wall portion and stays in the filter chamber. Thereafter, thermal particles that flow into the filter chamber later ignite and explosively burn this unburnt cracked gas.

In this connection, when volume ratio V2/V1 described above satisfies the condition of $V2/V1 \leq 0.32$, occurrence of such a mechanism of increase in internal pressure can be suppressed, and hence increase in internal pressure in the combustion chamber can effectively be suppressed.

Therefore, when volume ratio V2/V1 described above satisfies the condition of $0.05 \leq V2/V1 \leq 0.32$ as in cylinder type gas generator 1 according to the present embodiment, not only the stable operations can be performed but also increase in internal pressure in the combustion chamber at the time of activation can effectively be suppressed. Accordingly, the thickness of the housing can be decreased in correspondence. Reduction in weight and manufacturing cost of cylinder type gas generator 1 can thus be achieved by devisal of the structure as described above.

Cylinder type gas generator 1 according to the present embodiment is constructed such that ignition portion 42 of igniter 40 directly faces gas generating agent 60 without another member being interposed. According to such a construction, gas generating agent 60 can start burning early when igniter 40 is activated. Therefore, ignitability immediately after start of activation of igniter 40 can be improved, and firepower produced at that time can be enhanced.

Therefore, by adopting the construction, many gas generating agents can start burning at once and the opening is provided in partition member 50 earlier.

Therefore, gas generated in gas generating agent accommodation chamber S1 can more smoothly flow into filter chamber S2 and increase in internal pressure in the combustion chamber can further effectively be suppressed.

In order to further effectively suppress increase in internal pressure in the combustion chamber, a diameter of hollow portion 81 of filter 80 is preferably increased (for example, the diameter not smaller than 11 mm). According to such a construction, an area of the opening provided in partition member 50 at the time of activation can be made larger. Therefore, gas generated in gas generating agent accommodation chamber S1 can more smoothly flow into filter chamber S2 and increase in internal pressure in the combustion chamber can further effectively be suppressed.

Cylinder type gas generator 1 according to the present embodiment is constructed such that the axial end of coil spring 70 located on the side of filter chamber S2 is inserted in the inside of partition member 50 as described above. Thus, in manufacturing of cylinder type gas generator 1, with coil spring 70 being assembled to partition member 50, that partition member 50 as a whole can be attached to housing main body 10 and hence an effect of facilitation of manufacturing thereof is obtained.

Japanese Patent Laying-Open No. 2007-314102 (PTL 1) described previously discloses the cylinder type gas generator in which the coil spring is interposed between the partition member and the gas generating agent in the inside of the gas generating agent accommodation chamber as in cylinder type gas generator 1 according to the present embodiment. The coil spring disclosed in the literature, however, is provided to prevent an unburnt gas generating agent from flowing into the filter chamber, and it is completely different in function from coil spring 70 equipped in cylinder type gas generator 1 according to the present embodiment. In actual, the literature is silent not only about the volume ratio described above but also about suppression by the coil spring, of increase in internal pressure at the time of activation.

(Verification Test)

Figure 5:
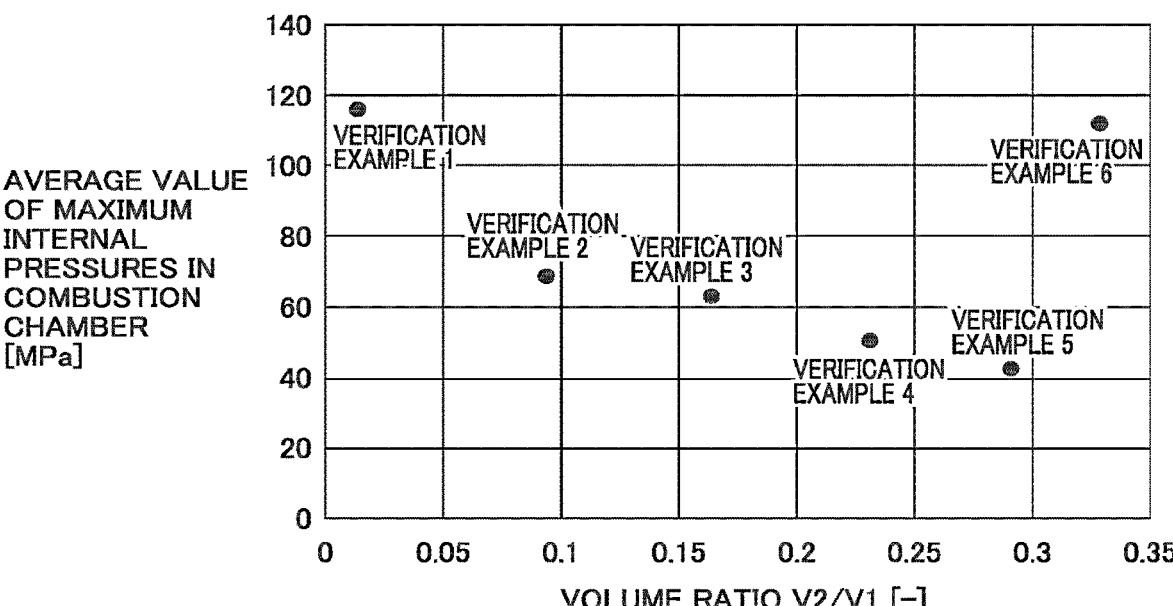
FIG. 5 shows a graph of the test results in the verification test.

FIG. 4 shows a table of a summary of test conditions and test results in a verification test and FIG. 5 shows a graph of the test results in the verification test. The verification test conducted by the present inventors will be described below with reference to FIGS. 4 and 5 and FIG. 1 described previously.

In the verification test, cylinder type gas generators obtained by variously varying volume ratio V2/V1 described above were actually manufactured as verification examples 1 to 6, and a maximum internal pressure in the combustion chamber at the time of operation was measured by activating each of the cylinder type gas generators.

The cylinder type gas generators according to verification examples 1 to 6 were each in conformity with the construction of cylinder type gas generator 1 according to the embodiment described above, and a difference among the cylinder type gas generators according to verification examples 1 to 6 basically resides only in axial length L2 of coil spring 70 shown in FIG. 1. The reason why an axial length L1 of gas generating agent accommodation chamber S1 (more strictly, an axial length of a portion of gas generating agent accommodation chamber S1 except for a portion where combustion control member 45 was arranged) was different in the cylinder type gas generators according to verification examples 1 to 6 is that axial length L2 of coil spring 70 described above was different and the axial length of the portion of gas generating agent accommodation chamber S1 where gas generating agent 60 was accommodated was basically the same.

Gas generating agent 60 included in each of the cylinder type gas generators according to verification examples 1 to 6 was mainly composed of guanidine nitrate (GN) and basic copper nitrate (BCN), and the number of moles thereof was each 0.45 mol. An inner diameter R of housing main body 10 included in each of the cylinder type gas generators according to verification examples 1 to 6 was 17.4 mm, and an outer diameter and an inner diameter of coil spring 70 included in each of the cylinder type gas generators according to verification examples 1 to 6 were 16.2 mm and 14.6 mm, respectively.

A point of measurement of the maximum internal pressure at the time of activation of the cylinder type gas generators according to verification examples 1 to 6 was set to a position in a substantially central portion of a portion of closing member 30 that faces filter chamber S2 (see a point P shown in FIG. 1).

Two samples of each of the cylinder type gas generators according to verification examples 1, 3, and 4 were prepared, and only a single sample of each of the cylinder type gas generators according to verification examples 2, 5, and 6 was prepared. An average value of the maximum internal pressures in the combustion chambers of the two samples prepared for each of the cylinder type gas generators according to verification examples 1, 3, and 4 is plotted in a graph in FIG. 5. Referring to FIGS. 4 and 5, it was confirmed based on results in the verification test that the maximum internal pressure in the combustion chamber was significantly lower in the cylinder type gas generators according to verification examples 2 to 5 in which volume ratio V2/V1 described above was 0.093, 0.164, 0.231, and 0.291, respectively, than the cylinder type gas generators according to verification examples 1 and 6 where volume ratio V2/V1 described above was 0.014 and 0.329, respectively. Specifically, the maximum internal pressure in the combustion chamber in each of the cylinder type gas generators according to verification examples 1 and 6 exceeded 100 MPa, whereas the maximum internal pressure in the combustion chamber in each of the cylinder type gas generators according to verification examples 2 to 5 was lower than 80 MPa. In the table shown in FIG. 4, the sample in which the maximum internal pressure in the combustion chamber was lower than 100 MPa was evaluated as "good" and the sample in which the maximum internal pressure in the combustion chamber exceeded 100 MPa was evaluated as "not good."

It is understood based on the results that at least the maximum internal pressure in the combustion chamber can be suppressed to approximately 100 MPa or lower by above-described volume ratio V2/V1 satisfying the condition of $0.05 \leq V2/V1 \leq 0.32$. Furthermore, it is understood that, in order to suppress the maximum internal pressure in the combustion chamber to approximately 80 MPa or lower to reliably achieve the effect, volume ratio V2/V1 described above preferably satisfies a condition of $0.08 \leq V2/V1 \leq 0.31$, and in order to suppress the maximum internal pressure in the combustion chamber to approximately 70 MPa or lower to further reliably achieve the effect, volume ratio V2/V1 described above preferably satisfies a condition of $0.09 \leq V2/V1 \leq 0.30$.

Axial length L2 of coil spring 70 at which volume ratio V2/VI described above actually satisfies the condition of $0.05 \leq V2/V1 \leq 0.32$ in the cylinder type gas generator having the construction manufactured in the present verification test is approximately not smaller than 5 mm and not larger than 25 mm.

It may have been confirmed based on the results of the verification test described above that, with cylinder type gas generator 1 according to the embodiment described above, the gas generator that can achieve not only stable operations but also reduction in weight and manufacturing cost by devisal of the structure thereof can be obtained.

(Other Forms)

Though the cylinder type gas generator formed from the holder assembly in which one axial end of the housing is formed from the holder portion made of metal and the connector portion made of resin is illustrated and described in the embodiment of the present invention above, instead, one axial end of the housing may be formed only from the holder made of metal.

In the embodiment of the present invention described above, the cylinder type gas generator not equipped with an autoignition agent which self-ignites without depending on activation of the igniter is illustrated and described. The cylinder type gas generator, however, may include the autoignition agent. The autoignition agent self-ignites at a temperature lower than a temperature of self-ignition of the gas generating agent, and it serves not to induce an abnormal operation due to external heating of the cylinder type gas generator in case of fire in a vehicle equipped with an air bag apparatus incorporating the cylinder type gas generator. In providing the autoignition agent in the cylinder type gas generator, for example, the autoignition agent should only be arranged to abut on the partition member in the space in the combustion chamber. In that case, by way of example, autoignition agent can be fixed by being sandwiched between the coil spring and the partition member.

In the embodiment of the present invention described above, an example in which the present invention is applied to a cylinder type gas generator incorporated in a side air bag apparatus is illustrated and described. Applications of the present invention, however, are not limited thereto and the present invention can be applied also to a cylinder type gas generator incorporated in a curtain air bag apparatus, a knee air bag apparatus, or a seat cushion air bag apparatus or what is called a T-shaped gas generator having an elongated outer geometry similarly to the cylinder type gas generator.

The embodiment disclosed herein is thus illustrative and non-restrictive in every respect. The technical scope of the present invention is delimited by the terms of the claims, and includes any modifications within the scope and meaning equivalent to the terms of the claims.

REFERENCE SIGNS LIST 1 cylinder type gas generator; 10 housing main body; 11 gas discharge opening; 12 to 14 swaging portion; 20 holder assembly; 20A holder portion; 20B connector portion; 21 first barrel portion; 22 annular projection; 23a accommodation portion; 23b swaging portion; 24 second barrel portion; 25 cylindrical portion; 26 annular stepped surface; 27 sealing member; 30 closing member; 40 igniter; 41 base; 42 ignition portion; 43 terminal pin; 45 combustion control member; 45a annular recess; 50 partition member; 51 separation wall portion; 51a score; 52 annular wall portion; 60 gas generating agent; 70 coil spring; 71 cylindrical portion; 72 pressing portion; 80 filter; 81 hollow portion; 90 welded portion; S1 gas generating agent accommodation chamber; S1A non-filled space; S1B filled space; S2 filter chamber.

The invention claimed is:

1. A gas generator comprising:

an elongated cylindrical housing containing a gas generating agent accommodation chamber where a gas generating agent is accommodated and a filter chamber where a filter is arranged and having one end and the other end in an axial direction closed;

a partition member that axially partitions a space in inside of the housing such that the gas generating agent accommodation chamber is provided at a position on a side of the one end of the housing and the filter chamber is provided at a position on a side of the other end of the housing;

an igniter assembled to the one end of the housing for burning the gas generating agent; and a coil spring accommodated in the gas generating agent accommodation chamber by being interposed between the partition member and the gas generating agent, the coil spring fixing the gas generating agent inside of the gas generating agent accommodation chamber by biasing the gas generating agent toward the one end of the housing while the coil spring keeps the gas generating agent away from the partition member, wherein the gas generator satisfies a condition of $0.05 \leq V2/V1 \leq 0.32$, where V1 represents a volume of the gas generating agent accommodation chamber and V2 represents a volume of a non-filled space, the non-filled space being a space where the gas generating agent is not arranged inside of the gas generating agent accommodation chamber as a result of arrangement of the coil spring, wherein the partition member is formed from a cylindrical member with a bottom, the cylindrical member including a separation wall portion arranged to be orthogonal to the axial direction of the housing and an annular wall portion erected from a circumferential edge of the separation wall portion toward the one end of the housing, and wherein an axial end of the coil spring located on the side of the other end of the housing is inserted at least inside of the partition member.

2. The gas generator according to claim 1, wherein the igniter includes an ignition portion where an ignition agent is accommodated, and the ignition portion faces the gas generating agent without another member being interposed.

3. The gas generator according to claim 1, wherein the coil spring includes a cylindrical portion located on a side of the partition member and a pressing portion that presses the gas generating agent toward the one end of the housing by being located at an end of the cylindrical portion on a side of the gas generating agent.

4. The gas generator according to claim 2, wherein the coil spring includes a cylindrical portion located on a side of the partition member and a pressing portion that presses the gas generating agent toward the one end of the housing by being located at an end of the cylindrical portion on a side of the gas generating agent.

* * * * *